(12) United States Patent
Vorganti

(10) Patent No.: US 10,437,714 B2
(45) Date of Patent: Oct. 8, 2019

(54) SYSTEM AND METHOD FOR PERFORMING SCRIPT-LESS UNIT TESTING

(71) Applicant: Wipro Limited, Bangalore (IN)

(72) Inventor: Surya Vorganti, Belle Mead, NJ (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/414,662

(22) Filed: Jan. 25, 2017

(65) Prior Publication Data
US 2018/0210823 A1    Jul. 26, 2018

(51) Int. Cl.
*G06F 11/36* (2006.01)
(52) U.S. Cl.
CPC ...... *G06F 11/3688* (2013.01); *G06F 11/3684* (2013.01)
(58) Field of Classification Search
CPC .................. G06F 11/3684; G06F 11/3688
USPC ......................................... 717/124
See application file for complete search history.

(56) References Cited

U.S. PATENT DOCUMENTS

| 5,652,835 | A * | 7/1997 | Miller | G06F 11/3684 706/55 |
|---|---|---|---|---|
| 6,725,399 | B1 * | 4/2004 | Bowman | G06F 11/3664 714/38.14 |
| 6,889,158 | B2 * | 5/2005 | Penov | G06F 11/3688 702/119 |
| 7,237,231 | B2 * | 6/2007 | Lambert | G06F 11/3684 714/38.14 |
| 7,797,687 | B2 * | 9/2010 | Tillmann | G06F 11/3684 714/38.14 |
| 7,926,042 | B2 * | 4/2011 | Mehta | G06F 11/3676 717/130 |
| 8,024,709 | B2 * | 9/2011 | Jadhav | G06F 11/3676 714/738 |
| 8,239,831 | B2 * | 8/2012 | Brennan | G06F 11/3664 717/124 |
| 8,245,194 | B2 * | 8/2012 | Atkin | G06F 11/3688 717/106 |

(Continued)

OTHER PUBLICATIONS

"An Automation of Software Testing: A Foundation for the Future"; Ravinder Veer Hooda; International Journal of Latest Research in Science and Technology, vol. 1,Issue 2 :No. 152-154 ,Jul.-Aug. 2012.*

*Primary Examiner* — Francisco J Aponte
(74) *Attorney, Agent, or Firm* — Finnegan, Henderson, Farabow, Garrett & Dunner, LLP

(57) ABSTRACT

Systems and methods for performing unit testing are described. During code level testing of the software code, the software code is scanned and converted into compiled code which is received by the system. The system further converts back the compiled code into its source code which comprises several units of source. However, the system filters out only user-defined units of source code for testing. The system further identifies rules for the units of source to be tested. Further, based on the rules and content of the units of source code, the system determines expected parameters. Further, the system utilizes the expected parameters for generating test eases for units of source code. The test eases generated may be a. combination of positive and/or negative test case. This way, the system automatically generates the test .cases and performs unit testing by using the generated test cases.

18 Claims, 4 Drawing Sheets

(56) References Cited

U.S. PATENT DOCUMENTS

| | | | | |
|---|---|---|---|---|
| 8,370,811 B2* | 2/2013 | Grechanik | | G06F 11/368 717/125 |
| 8,826,084 B1 | 9/2014 | Gauf et al. | | |
| 9,009,682 B2* | 4/2015 | Tsantilis | | G06F 11/3688 717/124 |
| 9,043,759 B1* | 5/2015 | Lininger | | G06F 11/3684 717/106 |
| 9,128,728 B2* | 9/2015 | Siman | | G06F 8/433 |
| 9,280,442 B1* | 3/2016 | Nicolo | | G06F 11/3604 |
| 9,329,978 B2* | 5/2016 | Kadishay | | G06F 11/3676 |
| 9,632,754 B2* | 4/2017 | Gyure | | G06F 8/30 |
| 9,697,110 B1* | 7/2017 | Arkadyev | | G06F 11/3696 |
| 9,836,385 B2* | 12/2017 | Malla | | G06F 11/3664 |
| 10,210,075 B2* | 2/2019 | Balsavias | | G06F 11/3684 |
| 2002/0188890 A1* | 12/2002 | Shupps | | G06F 8/75 714/38.14 |
| 2007/0033443 A1* | 2/2007 | Tillmann | | G06F 11/3684 714/45 |
| 2008/0115114 A1* | 5/2008 | Palaparthi | | G06F 11/3688 717/128 |
| 2008/0209401 A1* | 8/2008 | Fanning | | G06F 8/53 717/124 |
| 2008/0256517 A1* | 10/2008 | Atkin | | G06F 11/3688 717/124 |
| 2008/0307264 A1* | 12/2008 | de Halleux | | G06F 11/3688 714/38.1 |
| 2010/0180260 A1* | 7/2010 | Chikkadevaiah | | G06F 11/3664 717/125 |
| 2010/0198799 A1* | 8/2010 | Krishnan | | G06F 11/3696 707/702 |
| 2011/0016453 A1* | 1/2011 | Grechanik | | G06F 11/368 717/125 |
| 2011/0123973 A1* | 5/2011 | Singh | | G06F 11/3668 434/322 |
| 2012/0102458 A1* | 4/2012 | Meijer | | G06F 8/73 717/123 |
| 2013/0055198 A1* | 2/2013 | Weigert | | G06F 8/10 717/106 |
| 2015/0058675 A1* | 2/2015 | Kadishay | | G06F 11/3676 714/38.1 |
| 2015/0244737 A1* | 8/2015 | Siman | | G06F 21/51 726/23 |
| 2016/0147641 A1* | 5/2016 | Malla | | G06F 11/3692 717/125 |

* cited by examiner

SYSTEM AND METHOD FOR PERFORMING SCRIPT-LESS UNIT TESTING

TECHNICAL FIELD

The present disclosure relates in general to software testing. More particularly, but not exclusively, the present disclosure discloses a method and system for performing script-less unit testing.

BACKGROUND

Software testing is one of a crucial phase in a software development life cycle. The software testing is performed to compare actual and expected results produced by executing a software code. One of a type of the software testing is a unit testing, in which, a smallest testable part i.e., unit of source code is tested. For performing the unit testing, a software developer or a tester has to perform a separate task of writing test codes or test cases. These test codes or test cases are written for each unit of source code in different combinations to adequately cover the possible aspects for the testing.

The task of writing the test codes or test cases is a time-consuming task for the software developers/testers. Apart from the time-consumption, another issue is accuracy of the test codes or the test cases. Accuracy in the sense that all the possible combination of positive and negative test cases should be covered adequately. The issues of time-consumption and the accuracy increases not only with the length of the software code to be tested, but also based on the complexity of the software code.

SUMMARY

Disclosed herein is a method and system for performing unit testing. Once a software code is developed, it is scanned to generate compiled code like .exe, .dll, .war, .jar and the like. The system executes the compiled format of the software code to perform the testing. While executing, the system generates source code and further classifies the source code into testable and non-testable components. The classification is performed such that all the user-defined methods, subroutines, procedures, functions, callable units, subprograms are classified under the testable component, whereas all the system-defined methods, subroutines, procedures, functions, callable units, subprograms are classified under the non-testable components. These methods, subroutines, procedures, functions, callable units, subprograms are collectively called as units of source code.

Further, the system identifies one or more rules from a set of organized rules corresponding to the testable components i.e., the units of source code which are defined by the user or developer. The identification of rules is based on content or nature of the units of source code present in the testable component. Now, the next task is to test each of the units of source code without letting the developer go through the time-consuming and complex process of writing test cases for each of the units of source code. To achieve this objective, the system identifies expected parameters corresponding to each of the units of source code. Based on the expected parameters, the system automatically generates possible test cases for performing the unit testing, thereby facilitating a script-less unit testing. The detail of facilitating of the script-less unit testing is explained in subsequent paragraphs of the specification.

Accordingly, the present disclosure relates to a method of performing unit testing. The method comprises the step of generating a source code based on a compiled code received from a user. Further, the method comprises classifying the source code into testable components and non-testable components. The testable components comprise units of source code. The method further comprises identifying one or more rules from a set of organized rules based on the units of source code. Further, the method comprises determining one or more expected parameters corresponding to a unit of source code based on the one or more rules and content of the unit of source code. The content comprises one or more input fields. The method further comprises a step of generating one or more test cases for each of the one or more input fields of the unit of source code by using the one or more expected parameters. Further, the method comprises a step of performing a script-less unit testing of the compiled code by executing the one or more test cases.

Further, the present disclosure relates to a testing system for performing unit testing. The testing system comprises a processor and a memory communicatively coupled to the processor. The memory stores processor-executable instructions, which, on execution, causes the processor to perform one or more operations comprising generating a source code based on a compiled code received from a user. The system further classifies the source code into testable components and non-testable components. The testable components comprise units of source code. The system further identifies one or more rules from a set of organized rules based on the units of source code. Further, the system determines one or more expected parameters corresponding to a unit of source code based on the one or more rules and content of the unit of source code. The content comprises one or more input fields. Further, the system generates one or more test cases for each of the one or more input fields of the unit of source code by using the one or more expected parameters. The system further performs a script-less unit testing of the compiled code by executing the one or more test cases.

Further, the present disclosure relates to a non-transitory computer-readable storage medium for performing unit testing is disclosed, which when executed by a computing device, causes the computing device to perform operations including generating a source code based on a compiled code received from a user. The operations, further include classifying the source code into testable components and non-testable components. The testable components comprise units of source code. The operation further identifies one or more rules from a set of organized rules based on the units of source code. Further, the operation include determining one or more expected parameters corresponding to a unit of source code based on the one or more rules and content of the unit of source code. The content comprises one or more input fields. Further, the operations include generating one or more test cases for each of the one or more input fields of the unit of source code by using the one or more expected parameters. Finally the operations include performing a script-less unit testing of the compiled code by executing the one or more test cases.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
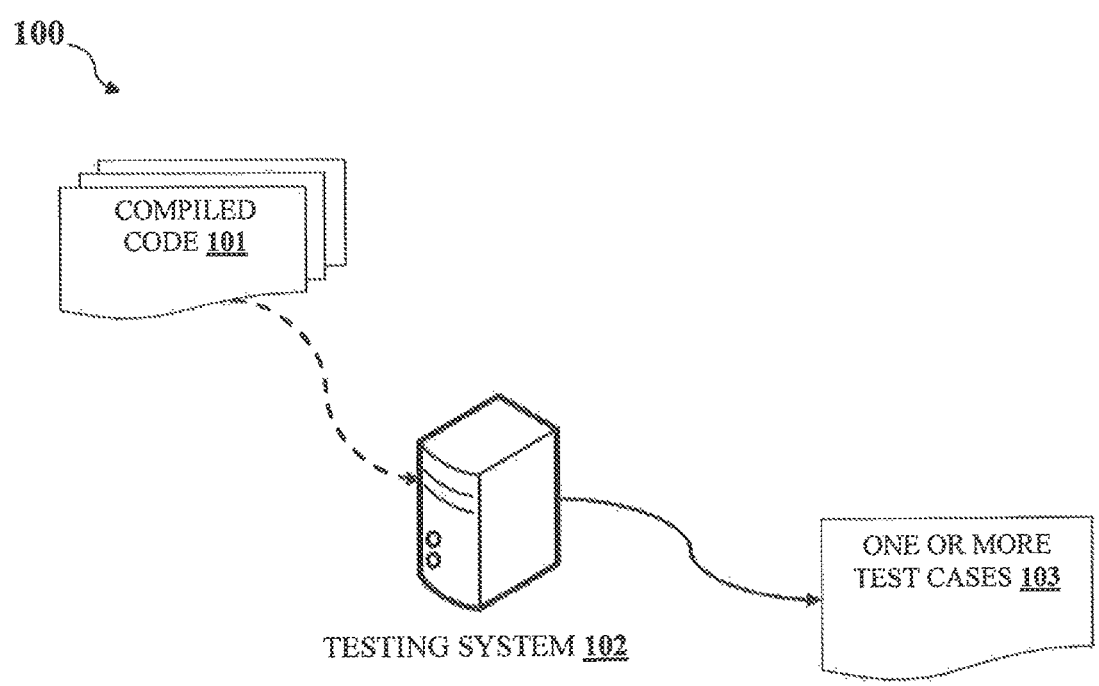
FIG. 1 shows an exemplary environment illustrating a testing system for performing unit testing in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a testing system (alternatively also referred as "system") for performing unit testing. Although, the method for performing the unit testing is described in conjunction with a server, the said method can also be implemented in various computing systems/devices, other than the server. When a software code is developed by a developer, the next job to be performed is to test that software code to verify whether outcome of the software code meets expectation. To verify this, software testing is performed from various perspectives. One of the perspective is testing the software code at code level, or in other words, testing each method, function, subroutine etc., (i.e., unit of source code) present in the software code. This type of testing is called as unit testing.

Conventionally, the unit testing is performed by manually writing test codes or test cases which requires a lot of time and effort of the developer. Since the developer uses their skills and experiences for writing the test cases, the accuracy and correctness differs from case to case basis. It may happen that a developer or tester may miss some important test cases during the unit testing. This may affect the overall performance of the system performing the unit testing. To overcome this issue, the present disclosure discloses about a script-less unit testing, in which, the system facilitates automatic generation of test cases which is explained herein detail.

The software code developed by the developer may be scanned to convert it into compiled code i.e., an executable code like .dll or .jar associated with a programming language. The compiled code is considered by the system for performing the unit testing. According to embodiments, the system when executes the compiled code, a source code is generated. This source code may comprise several units of source code like a method, a routine, a subroutine, a function, a callable unit, and a subprogram. The units of source code may either be system-defined or user-defined.

However, for the purpose of unit testing, the system considers only the user-defined units of source code which are classified under testable component. The classification is performed by the system, in which, the source code is classified into testable and non-testable components. As discussed above, the testable components comprise user-defined units of source code which are considered for the testing, whereas the non-testable components comprise system-defined units of source code. Each of the units of source code is considered as smallest testable part while performing the unit testing.

Now, once the testable components are classified, the system may identify rules from a set of organized rule set. The rules are identified in a real-time based on content of the units of source code (testable components). For testing a particular unit of source code, the system may determine expected parameters (e.g., string, integer, etc.) based on the content of the unit of source code and the rules. The content may comprise one or more input fields defined in the structure of the unit of source code. Further, the system may generate test cases for each of the one or more input fields of the unit of source code by using the one or more expected parameters. These test cases may be a positive and negative test cases. Thus, by using the test cases generated, the system may perform a script-less unit testing of the source code.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a testing system for performing unit testing.

The environment 100 comprises a compiled code 101, the testing system 102 and a one or more test cases 103. The compiled code 101 may be an executable code like .dll or .exe or any any compiled code associated with a programming language. In an embodiment, the compiled code 101 may be received from a test management system or a user.

The testing system 102 receives the compiled code 101 from the user and then convert it into a source code for the purpose of performing unit testing. Post generating the source code which comprises several units of source code, the testing system 102 generates one or more test cases 103 for testing each of the units of source code. In an embodiment, the testing system 102 may include, but not limited to, a server, a computer, a workstation, a laptop, mobile phone, or any computing system/device capable of receiving, analysing and processing the useful information.

Figure 2:
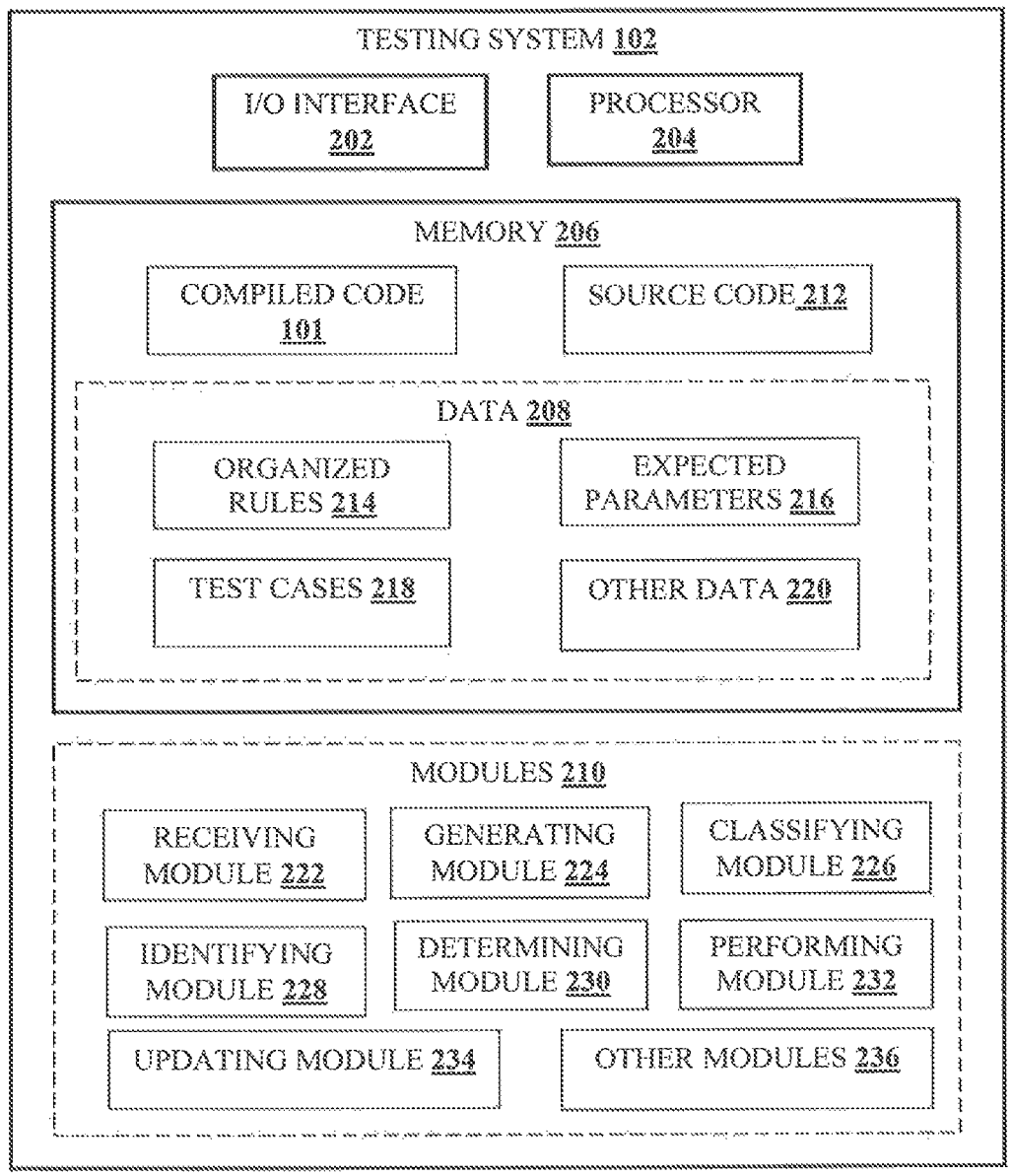
FIG. 2 shows a detailed block diagram illustrating the testing system in accordance with some embodiments of the present disclosure.

FIG. 2 shows a detailed block diagram illustrating the testing system in accordance with some embodiments of the present disclosure.

The testing system 102 comprises an I/O interface 202, a processor 204 and a memory 206. The I/O interface 202 is configured to receive one or more data, for example, a compiled code 101 from an external source. The memory 206 is communicatively coupled to the processor 204. The processor 204 is configured to perform one or more functions of the testing system 102 for performing the unit testing. In one implementation, the testing system 102 comprises data 208 and modules 210 for performing various operations in accordance with the embodiments of the present disclosure. The memory 206 further comprises a compiled code 101 received from the external source like test management system or user and source code 212. In an embodiment, the data 208 may include, without limitation, organized rules 214, expected parameters 216, test cases 218, and other data 220.

In one embodiment, the data 208 may be stored within the memory 206 in the form of various data structures. Additionally, the aforementioned data 208 can be organized using data models, such as relational or hierarchical data models. The other data 220 may store data, including temporary data and temporary files, generated by modules 210 for performing the various functions of the testing system 102.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the testing system 102.

In one implementation, the one or more modules 210 may include, without limitation, a receiving module 222, a generating module 224, a classifying module 226, an identifying module 228, a determining module 230, a performing module 232, an updating module 234 and other modules 236. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the receiving module 226 may receive a compiled code 101 from a test management system or from user/developer. The compiled code 101 represents an executable file like .exe file, .dll file, .war file or .jar file or any other compiled code associated with a programming language. When a software code is built or developed using different tools like eclipse or visual studio, the next job of the developer or tester is to test that software code. However, the software code needs to be converted into the compiled code format before performing the testing. One of a reason of such conversion is privacy concerns of an application linked with the software code. For example, the software code developed for a banking application or any application in which the exposure of its source code is not permissible. However, according to an embodiment, instead of receiving the compiled code 101 externally, the system 102 may itself scan the software code and convert it into the compiled code 101 format.

Once the compiled code 101 is received, the system 102 executes the compiled code 101. Upon the execution, the generating module 224 of the system 102 generates the source code 212 from the compiled code 101. In other words, the compiled code 101 is converted back to the source code 212 for the purpose of testing. The source code 212 comprises several units of source code. However, every unit of source code may not be required for the testing. This is because, some of the unit of source code may be system-defined, and hence testing is not required for them. Only those units of source code are considered which are defined by the user or the developer.

Therefore, to segregate the user-defined and system-defined units of source code, the classifying module 226 of the system 102 classifies the source code 212 into testable components and non-testable components. The testable components comprise the units of source code which are defined by the user/developer, whereas, the non-testable components comprise the units of source code which are defined by the system. This way, the system 102 filters out only the user-defined units of source code for the testing. As discussed earlier, the units of source code may comprise at least one of a subroutine, a procedure, a function, a method, a callable unit, and a subprogram associated with the compiled code 101. Further, the classification may also be performed from technologies perspective. According to an embodiment, the classifying module 226 may also help the system 102 understand about domain or technology associated with the units of source code classified under the testable components. For example, if the source code is written in dot net, then common language runtime (CLR) may be used for its execution. Similarly, if the source code is written in java, then java virtual machine (JVM) may be used for the execution.

In next step, the identifying module 228 of the system 102 may identify one or more rules from a set of organized rules 214 based on the units of source code classified under the testable components. The one or more rules help the system 102 understand scope of the units of source code to be tested. For example, if a method (i.e., a unit of source code) is defined as private, then the rule identified for that method will be a private rule. Similarly, if a method is defined as public, then rule identified for that method will be a public rule. Few examples of rules and their corresponding outcomes are shown in below table 1.

TABLE 1

Rules and their corresponding outcomes or scope

| Rule | Output or Scope |
| --- | --- |
| Public | Access is not restricted |
| Protected | Access is limited to the containing class or types derived from the containing class |
| Internal | Access is limited to the current assembly |
| Protected internal | Access is limited to the current assembly or types derived from the containing class |
| Private | Access is limited to the containing type |

From the above table 1, it can be observed that how the scope differs from one rule to another rule. For example, if a rule identified for a particular method is private rule, then method may be disassembled inside the dynamic link library (dll). However, the same method cannot be distributed to overall dll since it is a private method.

Once the rules are identified corresponding to the units of source code, in next step, the determining module 230 of the system 102 may determine one or more expected parameters for the units of source code by using the one or more rules and content of the units of source code. The content may comprise one or more input fields associated with the units of source code. For example, if a method "CreateProfile( )" (i.e., unit of source code) is defined for creating a profile of a user which have different input fields like "Name", "Age", and "Date of birth", then the expected parameters may be determined as string and integer. The string parameter corresponds to the input field "Name", whereas the integer parameter corresponds to the input fields "Age" and "Date of birth". These expected parameters help the system 102 understand different permutation and combination of possible test cases which may be required for the testing, which is explained in subsequent paragraphs of the specification.

Post determining the expected parameters, the receiving module 222 of the system 102 may provide a user-interface to receive values corresponding to the expected parameters and one or more testing parameters from the developer or tester. For example, if a method "Add( )" needs to be tested and it expects two parameters, then the developer or tester may input integer values such as 2, 3, through the user-interface, which may be compiled inside the system 102 as Add (2,3). Further, the testing parameters are those parameters that needs to be continuously tested. For example, for a method "Sum" to be tested, the parameters need to be passed are:

```
Int sum (int a, int b)
{
Return a+b;
}
```

Hence, for testing the above code, testing parameters need to be passed for "a" and "b" as an input for testing the function validity.

Now for testing a particular method or a function or a subroutine or a procedure (i.e., a unit of source code), the system 102, at first, may figure out corresponding input fields associated with that unit of source code. For example, if the method "CreateProfile( )" has to be tested, the system 102 figure out its input fields i.e., "Name", "Age", "PAN ID", and "Date of birth". Now since the system 102 have all the required information like expected parameters, input fields, and also the system 102 understands the domain of the unit of code, scope of testing, and permutation and combination of possible test cases, the automatic generation of the test cases is possible. Thus, generating module 224 of the system 102 may generate one or more test cases for each of the one or more input fields of the unit of source code by using the one or more expected parameters. In other words, developer's or tester's intervention or dependency for generating the test cases may be eliminated. Moreover, the accuracy is also maintained, since the system 102 has all the relevant information required for generating the test cases. Further, the test cases generated may be associated with a positive test case and/or a negative test case. This way, the system 102 generates the test cases for each of the units of source code present in the source code 212. For example, the main code for the above taken example "CreateProfile( )" may be written as:

Main Code for the Method CreateProfile( ):

```
Public void createprofile(string name, string panid)
{
    If(name!= null && panid != null && name.valid && pan.valid)
    {
    MakeAccount.Create( );
    }
    Else
    {
    Console.writeline("Error in your data");
    }
}
```

From the above main code, it can be observed that the "string" parameters are used for creating the profile. For testing the above code, the positive and negative test cases are required which may be generated by the system 102. An example of positive and negative test cases are shown below.

Positive Testcase:

```
[TestMethod]
public void TestAccount_Positive( )
{
Createprofile("Surya", "qwedfl2345");
Assert.Valid("TestPassed as arguments are right");
}
```

Negative TestCase:

```
[TestMethod]
public void TestAccount_Negative( )
{
    Createprofile("12222", "111~1112");
    Assert.Valid("Test Failed as arguments are incorrect");
}
```

From the above given examples of the positive and negatives test cases, it can be observed that 6 lines of code are required for testing one scenario in one category (positive or negative). Writing the test codes for each scenario manually is a time taking task, and also the accuracy of test cases may be another issue. Thus, the automatic generation of the test cases enhance the overall performance of the system 102.

Once the test cases are generated, the performing module 232 of the system 102 performs the script-less unit testing of the compiled code 101 based on the test cases generated. According to embodiments, if a new unit of source code is added in the software code, the updating module 234 of the system 102 may dynamically update the newly added unit of source code into the testable components. Thus, system 102 facilitates a script-less unit testing for testing the compiled code.

Figure 3:
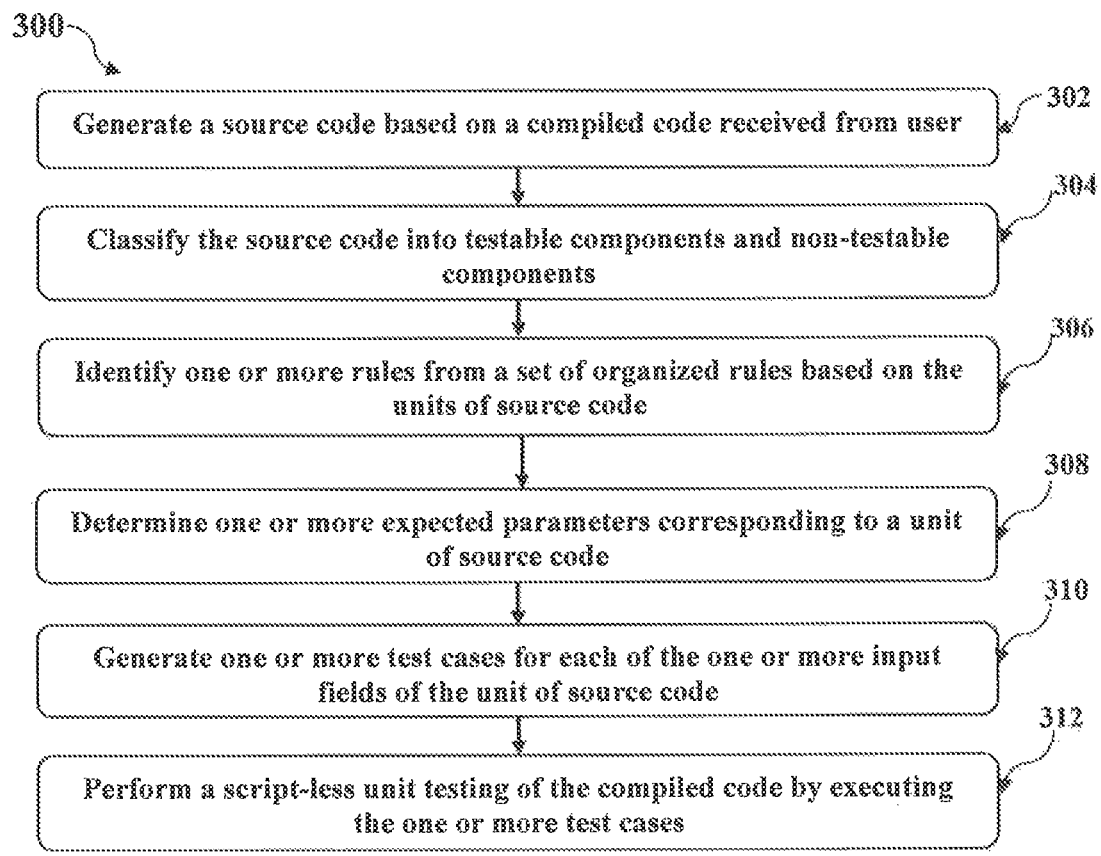
FIG. 3 shows a flowchart illustrating a method of performing unit testing in accordance with some embodiments of the present disclosure.

FIG. 3 shows a flowchart illustrating a method for performing unit testing with some embodiments of the present disclosure.

As illustrated in FIG. 3, the method 300 comprises one or more blocks for performing unit testing using a testing system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the testing system 102 generates a source code based on a compiled code received from a test management system or from a user. The compiled code comprises at least one of an executable code (e.g., .exe, .dll, .war, .jar) and any compiled code associated with a programming language.

At block 304, the testing system 102 classifies the source code into testable components and non-testable components. The testable components comprise units of source code, for example, a subroutine, a procedure, a function, a method, a callable unit, or a subprogram associated with the compiled code.

At block 306, the testing system 102 identifies one or more rules from a set of organized rules based on the units of source code.

At block 308, the testing system 102 determines one or more expected parameters corresponding to a unit of source code based on the one or more rules and content of the unit of source code. Further, the content comprises one or more input fields.

At block 310, the testing system 102 generates one or more test cases for each of the one or more input fields of the unit of source code by using the one or more expected parameters.

At block 312, the testing system 102 performs a scriptless unit testing of the compiled code by executing the one or more test cases.

Computer System

Figure 4:
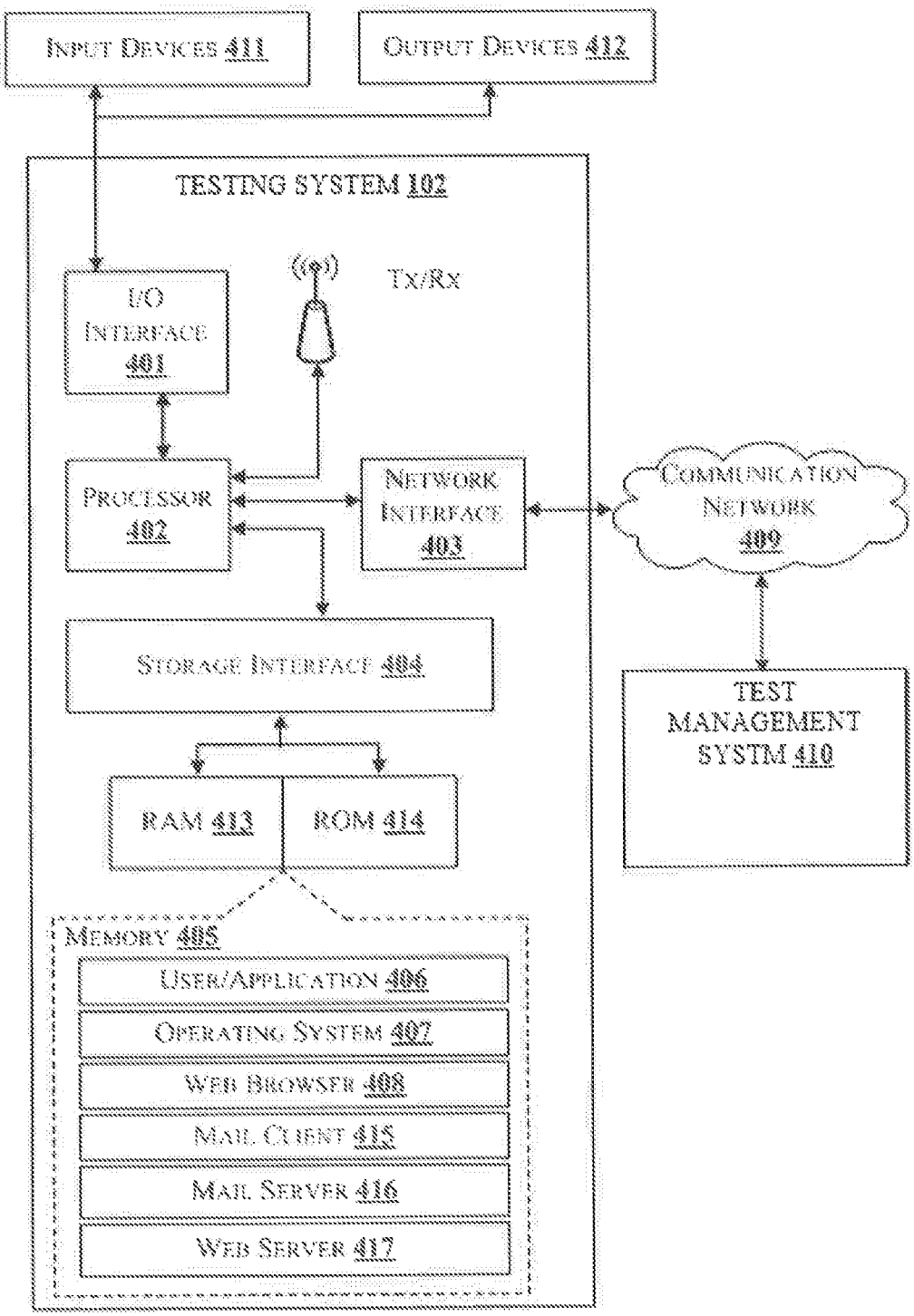
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the testing system 102 which is used for performing unit testing. According to an embodiment, the computer system 400 may receive compiled code 101 from a test management system 410 or from a user. However, according to other embodiment, the computer system 400 may scan the software code to generate the compiled code internally. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/nix, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for performing unit testing in a real-time by using the test cases.

In an embodiment, the method of present disclosure provides automatic generation of test cases i.e., without any manual intervention.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | ENVIRONMENT |
| 101 | COMPILED CODE |
| 102 | TESTING SYSTEM |
| 103 | ONE OR MORE TEST CASES |
| 202 | I/O INTERFACE |
| 204 | PROCESSOR |
| 206 | MEMORY |
| 208 | DATA |
| 210 | MODULES |
| 212 | SOURCE CODE |
| 214 | ORGANIZED RULES |
| 216 | EXPECTED PARAMETERS |
| 218 | TEST CASES |
| 220 | OTHER DATA |
| 222 | RECEIVING MODULE |
| 224 | GENERATING MODULE |
| 226 | CLASSIFYING MODULE |
| 228 | IDENTIFYING MODULE |
| 230 | DETERMINING MODULE |
| 232 | PERFORMING MODULE |
| 234 | UPDATING MODULE |
| 236 | OTHER MODULES |

I claim:

1. A method of performing unit testing, the method comprising:

generating, by a testing system, a source code based on a compiled code received from a user;

classifying, by the testing system, the source code into testable components and non-testable components, wherein the testable components comprise units of source code;

identifying, by the testing system, one or more rules from a set of organized rules based on the units of source code, wherein each rule defines a scope of test that is to be performed on the units of source code based on an access level of the units of source code, wherein the access level of the units of source code is a level of access to containing class, containing type and current assembly of the units of source code, and wherein the scope of test defined by one rule is different from another rule in the set of organized rules;

determining, by the testing system, one or more expected parameters corresponding to each unit of source code from the units of source code, based on the one or more rules and content of the unit of source code, wherein the content comprises one or more input fields;

generating, by the testing system, one or more test cases for each of the one or more input fields of the unit of source code by using the one or more expected parameters; and performing, by the testing system, a script-less unit testing of the compiled code by executing the one or more test cases.

2. The method as claimed in claim 1, wherein the compiled code comprises at least one of an executable code and any compiled code associated with a programming language.

3. The method as claimed in claim 1, wherein the units of source code comprises at least one of a subroutine, a procedure, a function, a method, a callable unit, or a subprogram associated with the compiled code.

4. The method as claimed in claim 1, wherein the one or more test cases are associated with at least one of a positive test case and a negative test case.

5. The method as claimed in claim 1 further comprising receiving values corresponding to the one or more expected parameters and one or more testing parameters from the user through a user-interface.

6. The method as claimed in claim 1 further comprising dynamically updating a newly added unit of source code into the testable components.

7. A testing system for performing unit testing, the system comprising:
a processor; and
a memory communicatively coupled to the processor, wherein the memory stores processor-executable instructions, which, on execution, causes the processor to:
generate a source code based on a compiled code received from a user;
classify the source code into testable components and non-testable components, wherein the testable components comprise units of source code;
identify one or more rules from a set of organized rules based on the units of source code, wherein each rule defines a scope of test that is to be performed on the units of source code based on an access level of the units of source code, wherein the access level of the units of source code is a level of access to containing class, containing type and current assembly of the units of source code, and wherein the scope of test defined by one rule is different from another rule;
determine one or more expected parameters corresponding to each unit of source code from the units of source code, based on the one or more rules and content of the unit of source code, wherein the content comprises one or more input fields;
generate one or more test cases for each of the one or more input fields of the unit of source code by using the one or more expected parameters; and
perform a script-less unit testing of the compiled code by executing the one or more test cases.

8. The testing system as claimed in claim 7, wherein the compiled code comprises at least one of an executable code and any compiled code associated with a programming language.

9. The testing system as claimed in claim 7, wherein the units of source code comprises at least one of a subroutine, a procedure, a function, a method, a callable unit, and a subprogram associated with the compiled code.

10. The testing system as claimed in claim 7, wherein the one or more test cases, are associated with at least one of a positive test case and a negative test case.

11. The testing system as claimed in claim 7, wherein the processor is further configured to receive values corresponding to the one or more expected parameters and one or more testing parameters from the user through a user-interface.

12. The testing system as claimed in claim 7, wherein the processor is further configured to dynamically update a newly added unit of source code into the testable components.

13. A non-transitory computer-readable medium storing instructions, wherein upon execution of the instructions by one or more processors, the processors perform operations comprising:
generating a source code based on a compiled code received from a user;
classifying the source code into testable components and non-testable components, wherein the testable components comprise units of source code;
identifying one or more rules from a set of organized rules based on the units of source code, wherein each rule defines a scope of test that is to be performed on the units of source code based on an access level of the units of source code, wherein the access level of the units of source code is a level of access to containing class, containing type and current assembly of the units of source code, and wherein the scope of test defined by one rule is different from another rule;
determining one or more expected parameters corresponding to each unit of source code from the units of source code, based on the one or more rules and content of the unit of source code, wherein the content comprises one or more input fields;
generating one or more test cases for each of the one or more input fields of the unit of source code by using the one or more expected parameters; and
performing a script-less unit testing of the compiled code by executing the one or more test cases.

14. The medium of claim 13, wherein the compiled code comprises at least one of an executable code and any compiled code associated with a programming language.

15. The medium of claim 13, wherein the units of source code comprises at least one of a subroutine, a procedure, a function, a method, a callable unit, and a subprogram associated with the compiled code.

16. The medium of claim 13, wherein the one or more test cases, are associated with at least one of a positive test case and a negative test case.

17. The medium of claim 13, wherein the processor is further configured to receive values corresponding to the one or more expected parameters and one or more testing parameters from the user through a user-interface.

18. The medium of claim 13, wherein the processor is further configured to dynamically update a newly added unit of source code into the testable components.

* * * * *